United States Patent
Fischer

(10) Patent No.: US 10,544,763 B2
(45) Date of Patent: Jan. 28, 2020

(54) FUEL PUMP AND FUEL SUPPLY SYSTEM USING THE SAME

(71) Applicant: DELPHI TECHNOLOGIES IP LIMITED, St. Michael (BB)

(72) Inventor: John G. Fischer, Goodrich, MI (US)

(73) Assignee: DELPHI TECHNOLOGIES IP LIMITED (BB)

( * ) Notice: Subject to any disclaimer, the term of this patent is extended or adjusted under 35 U.S.C. 154(b) by 204 days.

(21) Appl. No.: 15/456,836

(22) Filed: Mar. 13, 2017

(65) Prior Publication Data

US 2018/0258893 A1    Sep. 13, 2018

(51) Int. Cl.

| | |
|---|---|
| *F02M 37/10* | (2006.01) |
| *F04D 5/00* | (2006.01) |
| *F04D 7/02* | (2006.01) |
| *F04D 9/02* | (2006.01) |
| *F04D 13/08* | (2006.01) |
| *F04D 13/06* | (2006.01) |
| *F04D 13/12* | (2006.01) |
| *F04D 29/22* | (2006.01) |
| *F04D 29/02* | (2006.01) |
| *F04D 29/42* | (2006.01) |

(Continued)

(52) U.S. Cl.
CPC .......... *F02M 37/106* (2013.01); *F02M 37/08* (2013.01); *F04D 5/008* (2013.01); *F04D 13/06* (2013.01); *F04D 13/0653* (2013.01); *F04D 13/08* (2013.01); *H02K 5/132* (2013.01); *H02K 5/20* (2013.01)

(58) Field of Classification Search
CPC ...... F02M 37/08; F02M 37/048; F02M 59/44; F02M 37/0041; F02M 37/045; F02M 37/106; F02M 59/12; F04D 13/0653; F04D 13/06; F04D 13/08; F04D 29/0473; F04D 29/181; F04D 29/528; F04D 3/005; F04D 5/008; F04D 5/002; F04D 13/0606; F04D 29/188; F04D 29/548; F04D 29/406; F04D 29/669; H02K 5/132; H02K 5/20; H02K 1/17; H02K 5/12; H02K 9/19

See application file for complete search history.

(56) References Cited

U.S. PATENT DOCUMENTS

| | | | | |
|---|---|---|---|---|
| 4,566,866 A | * | 1/1986 | Kemmner | F02M 37/048 310/154.08 |
| 5,828,148 A | * | 10/1998 | Niggemann | H02K 5/12 310/86 |

(Continued)

*Primary Examiner* — Dominick L Plakkoottam
(74) *Attorney, Agent, or Firm* — Joshua M. Haines

(57) ABSTRACT

A fuel pump includes a motor having an armature which rotates about an axis, the motor also having a stator which circumferentially surrounds the armature such that a fuel passage is defined between the armature and the stator, whereby rotation of the armature induces a circumferential flow of fuel within the fuel passage; a pumping arrangement which is rotated by the armature and which pumps fuel from a first inlet to a first; a second inlet which introduces fuel into the fuel passage; a second outlet which discharges fuel from the fuel passage; and a flow impedance member in the fuel passage which impedes the circumferential flow of fuel within the fuel passage, thereby generating a pressure gradient across opposing sides of the flow impedance member such that fuel entering the fuel passage is pumped to the second outlet.

18 Claims, 5 Drawing Sheets

(51) Int. Cl.
*H02K 5/132* (2006.01)
*F02M 37/08* (2006.01)
*H02K 5/20* (2006.01)

(56) References Cited

U.S. PATENT DOCUMENTS

| | | |
|---|---|---|
| 6,405,717 B1 | 6/2002 | Beyer et al. |
| 10,184,475 B2 * | 1/2019 | Fischer .................... H02K 5/20 |
| 2014/0030119 A1 * | 1/2014 | Honda .................... F02M 59/12 |
| | | 417/321 |
| 2014/0116547 A1 | 5/2014 | Honda |
| 2019/0107121 A1 * | 4/2019 | Fischer .................... H02K 5/20 |

* cited by examiner

FUEL PUMP AND FUEL SUPPLY SYSTEM USING THE SAME

TECHNICAL FIELD OF INVENTION

The present invention relates to fuel pump, more particularly to a fuel pump for a fuel supply system which includes a fuel reservoir within a fuel tank, and even more particularly to such a fuel pump configured to pump fuel from the fuel tank into the fuel reservoir.

BACKGROUND OF INVENTION

Fuel supply systems for internal combustion engines typically include a fuel tank for storing a volume of fuel that will be supplied to the internal combustion engine by a fuel pump. When such fuel supply systems are provided for a motor vehicle, the fuel supply system also commonly includes a fuel reservoir positioned within the fuel tank. The fuel reservoir provides a volume of fuel which is filled by fuel from the fuel tank. The fuel pump is positioned within the fuel reservoir in order to ensure an adequate supply of fuel is available to the fuel pump when the fuel tank is not full and dynamics of the motor vehicle may cause the fuel within the fuel tank to slosh or migrate to an area of the fuel tank away from the fuel reservoir. In order to maintain a sufficient level of fuel within the fuel reservoir, a jet pump, powered by pressurized fuel from the fuel pump, is used to aspirate fuel from the fuel tank into the fuel reservoir. While jet pumps are effective for filling the fuel reservoir, operation of the jet pump is parasitic to the high pressure flow produced by the fuel pump. The parasitic nature of the jet pump can degrade fuel economy and increase harmful emissions produced by the internal combustion engine. Furthermore, the jet pump may require features which increase cost and complexity, for example, anti-siphon features which prevent drainage of the fuel reservoir when the fuel pump is not in operation. An example of such a fuel system which includes a jet pump to fill a fuel reservoir within a fuel tank is described in United States Patent Application Publication No. US 2014/0116547 A1 to Honda.

What is needed is a fuel supply system which minimizes or eliminates one or more of the shortcomings as set forth above.

SUMMARY OF THE INVENTION

Briefly described, a fuel pump includes a motor having an armature which rotates about an axis, the motor also having a stator which circumferentially surrounds the armature such that a fuel passage is defined radially between the armature and the stator, whereby rotation of the armature induces a circumferential flow of fuel within the fuel passage; a pumping arrangement which is rotated by the armature and which pumps fuel from a first inlet of the fuel pump to a first outlet of the fuel pump; a second inlet which introduces fuel into the fuel passage; a second outlet which discharges fuel from the fuel passage; and a flow impedance member in the fuel passage which impedes the circumferential flow of fuel within the fuel passage, thereby generating a pressure gradient across opposing sides of the flow impedance member within the fuel passage such that fuel entering the fuel passage through the second inlet at a low pressure side of the flow impedance member is pumped through the fuel passage to the second outlet at a high pressure side of the flow impedance member.

A fuel supply system for supplying fuel to a fuel consuming device includes a fuel tank which holds a volume of fuel; a fuel reservoir disposed within the fuel tank; and a fuel pump. The fuel pump includes a motor having an armature which rotates about an axis, the motor also having a stator which circumferentially surrounds the armature such that a fuel passage is defined radially between the armature and the stator, whereby rotation of the armature induces a circumferential flow of fuel within the fuel passage; a pumping arrangement which is rotated by the armature and which pumps fuel from within the fuel reservoir through a first inlet of the fuel pump to the fuel consuming device through a first outlet of the fuel pump; a second inlet which introduces fuel into the fuel passage from within the fuel tank and outside of the fuel reservoir; a second outlet which discharges fuel from the fuel passage to the fuel reservoir; and a flow impedance member in the fuel passage which impedes the circumferential flow of fuel within the fuel passage, thereby generating a pressure gradient across opposing sides of the flow impedance member within the fuel passage such that fuel entering the fuel passage through the second inlet at a low pressure side of the flow impedance member is pumped through the fuel passage to the second outlet at a high pressure side of the flow impedance member.

The fuel pump allows the fuel supply system to fill the fuel reservoir with fuel from the fuel tank without parasitic loss of high pressure fuel flow present in systems which employ a jet pump to fill the fuel reservoir with fuel from the fuel tank. In this way, efficiency may be improved which can result in improved fuel economy and reduced harmful emissions.

BRIEF DESCRIPTION OF DRAWINGS

This invention will be further described with reference to the accompanying drawings in which.

DETAILED DESCRIPTION OF INVENTION

Figure 1:
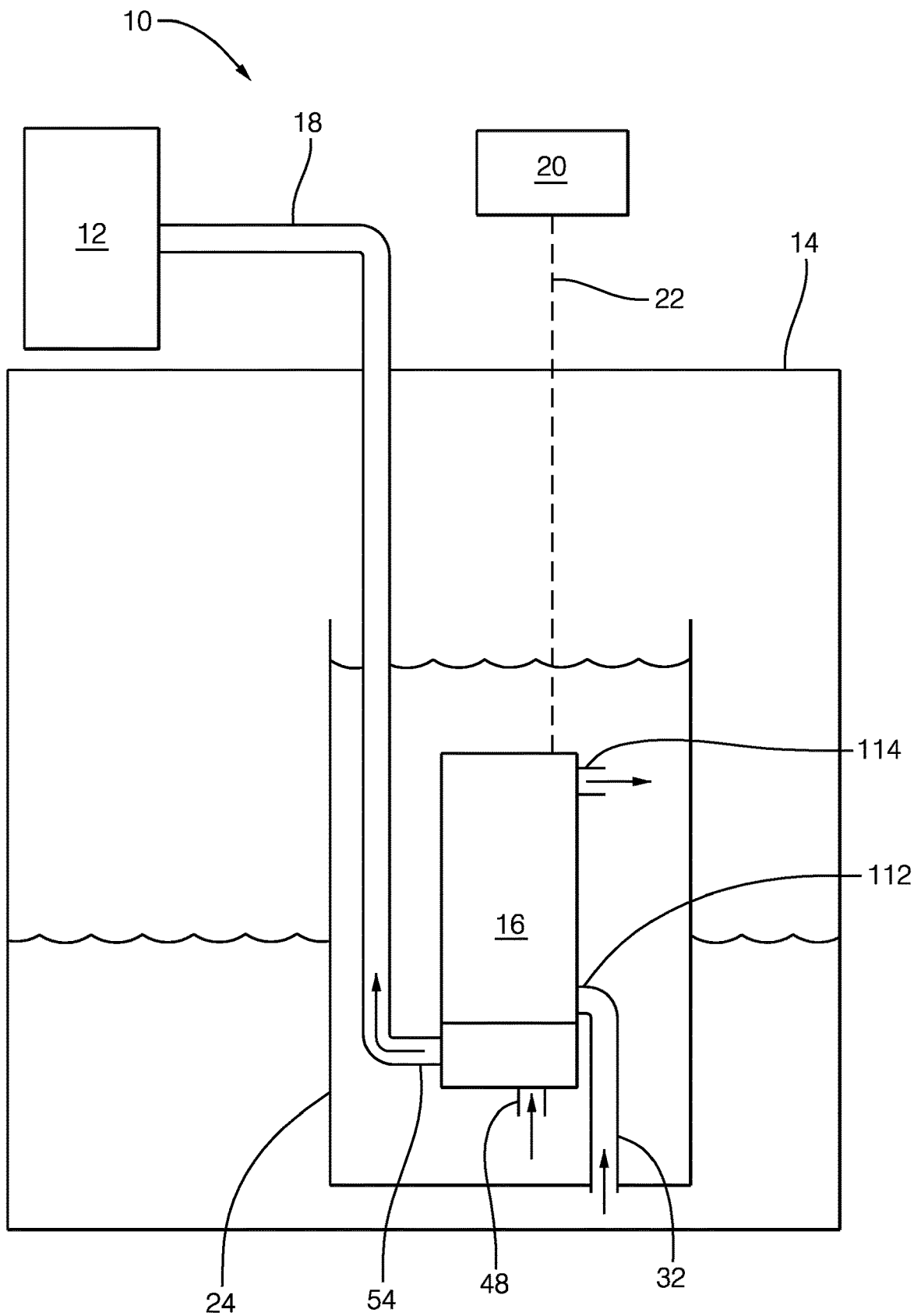
FIG. 1 a schematic of a fuel system in accordance with the present invention for supplying fuel to an internal combustion engine.
Figure 2:
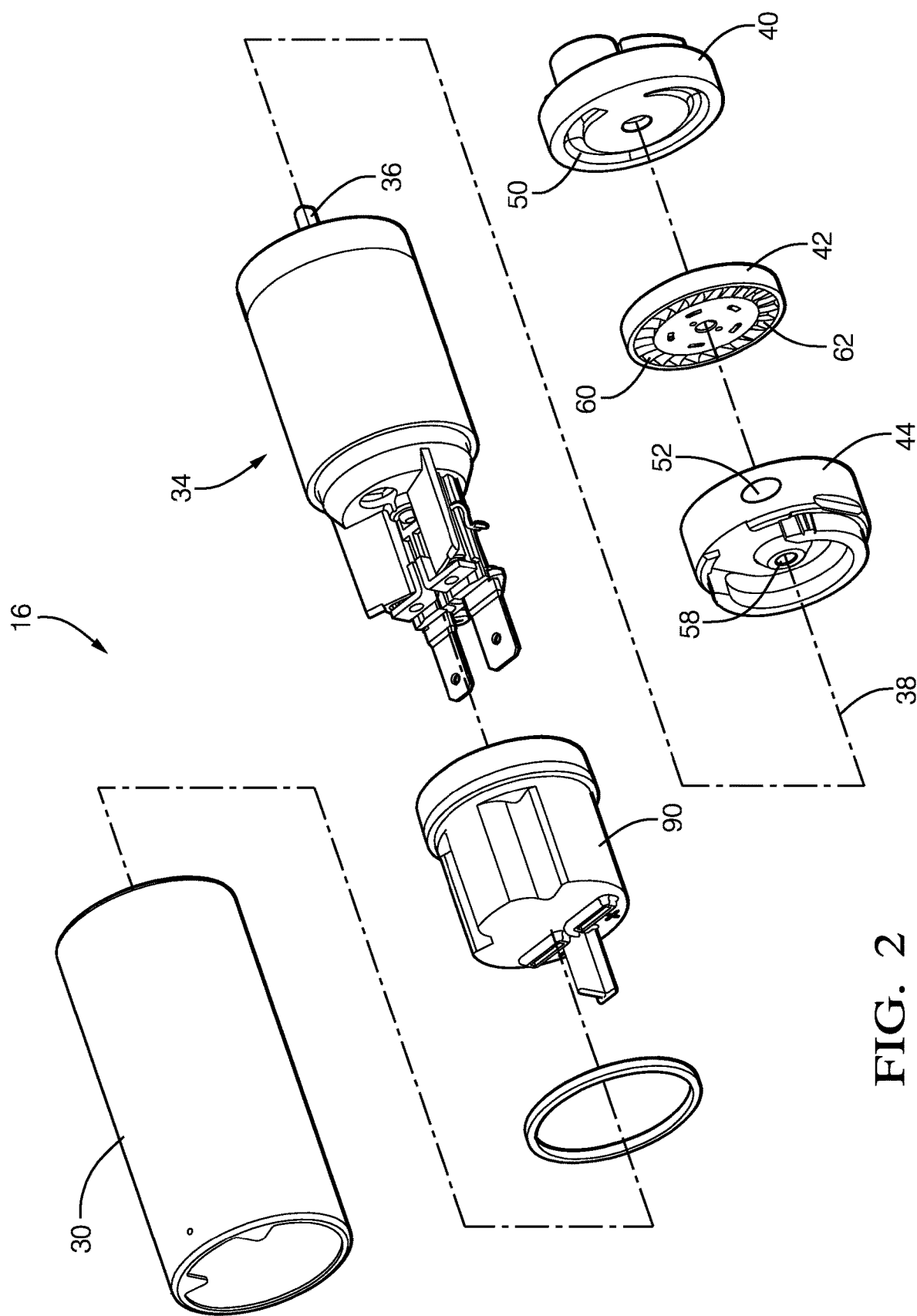
FIG. 2 is an exploded isometric view of the a fuel pump of the fuel system of FIG. 1.

Reference will first be made to FIG. 1 which is a schematic of a fuel system 10 in accordance with the invention for supplying fuel to a fuel consuming device illustrated by way of non-limiting example only as an internal combustion engine 12. The fuel of fuel system 10 may be any liquid fuel customarily used, for example only, gasoline, diesel fuel, alcohol, ethanol, and the like, and blends thereof.

Fuel system 10 includes a fuel tank 14 for storing a quantity of fuel and a fuel pump 16 for pumping fuel from fuel tank 14 to internal combustion engine 12. Fuel that is pumped by fuel pump 16 is communicated to internal combustion engine 12 through a fuel supply line 18. Fuel pump 16 is an electric fuel pump which receives electricity from an electricity source 20 through electrical conductor 22. Fuel pump 16 is disposed within a fuel reservoir 24 which is a separate container within fuel tank 14 that is filled with fuel from fuel tank 14. When the fuel level in fuel tank 14 is sufficiently high, fuel reservoir 24 is filled by fuel simply spilling over the top of fuel reservoir 24. However, when the fuel level in fuel tank 14 is not sufficiently high to spill over the top of fuel reservoir 24, fuel reservoir 24 is filled by fuel pump 16 as will be described in greater detail later.

In addition to FIG. 1, reference will now be made to FIGS. 2-6 in the description of fuel pump 16. Fuel pump 16 generally includes a pump section 26 at one end and a motor section 28 adjacent to pump section 26 at the other end. A housing 30 of fuel pump 16 retains pump section 26 and motor section 28 together. Fuel which is to be pumped to internal combustion engine 12 enters pump section 26, a portion of which is rotated by motor section 28 as will be described in more detail later, from within fuel reservoir 24 and is discharged from pump section 26 to fuel supply line 18 where it passes to internal combustion engine 12. Fuel which is used to fill fuel reservoir 24 when the fuel level within fuel tank 14 is below the top of fuel reservoir 24 enters motor section 28 through a fuel reservoir line 32 which draws fuel from fuel tank 14 outside of fuel reservoir 24 and is discharged from motor section 28 into fuel reservoir 24.

Motor section 28 includes an electric motor 34 which is disposed within housing 30. Electric motor 34 includes a shaft 36 extending therefrom into pump section 26. Shaft 36 rotates about an axis 38 when an electric current is applied to electric motor 34 from electricity source 20. Electric motor 34 will be described in greater detail later.

Pump section 26 includes an inlet plate 40, a pumping arrangement illustrated as impeller 42, and an outlet plate 44. Inlet plate 40 is disposed at the end of pump section 26 that is distal from motor section 28 while outlet plate 44 is disposed at the end of pump section 26 that is proximal to motor section 28. Both inlet plate 40 and outlet plate 44 are fixed relative to housing 30 to prevent relative movement between inlet plate 40 and outlet plate 44 with respect to housing 30. Outlet plate 44 defines a spacer ring 46 on the side of outlet plate 44 that faces toward inlet plate 40. Impeller 42 is disposed axially between inlet plate 40 and outlet plate 44 such that impeller 42 is radially surrounded by spacer ring 46. Impeller 42 is fixed to shaft 36 such that impeller 42 rotates with shaft 36 in a one-to-one relationship. Spacer ring 46 is dimensioned to be slightly thicker than the dimension of impeller 42 in the direction of axis 38, i.e. the dimension of spacer ring 46 in the direction of axis 38 is greater than the dimension of impeller 42 in the direction of axis 38. In this way, inlet plate 40, outlet plate 44, and spacer ring 46 are fixed within housing 30, for example by crimping the axial ends of housing 30. Axial forces created by the crimping process will be carried by spacer ring 46, thereby preventing impeller 42 from being clamped tightly between inlet plate 40 and outlet plate 44 which would prevent impeller 42 from rotating freely. Spacer ring 46 is also dimensioned to have an inside diameter that is larger than the outside diameter of impeller 42 to allow impeller 42 to rotate freely within spacer ring 46 and axially between inlet plate 40 and outlet plate 44. While the pumping arrangement has been illustrated as impeller 42, it should now be understood that other pumping arrangements may alternatively be used, by way of non-limiting example only, a gerotor, gears, or roller vanes. Furthermore, while spacer ring 46 is illustrated as being made as a single piece with outlet plate 44, it should be understood that spacer ring 46 may alternatively be made as a separate piece that is captured axially between outlet plate 44 and inlet plate 40.

Inlet plate 40 is generally cylindrical in shape, and includes an inlet plate inlet 48 that extends through inlet plate 40 in the same direction as axis 38. Inlet plate inlet 48 is a passage which introduces fuel into fuel pump 16 from fuel reservoir 24, and more specifically into pump section 26 from fuel reservoir 24. Inlet plate 40 also includes an inlet plate flow channel 50 formed in the face of inlet plate 40 that faces toward impeller 42 and is in fluid communication with inlet plate inlet 48.

Outlet plate 44 is generally cylindrical in shape and includes an outlet plate outlet passage 52 that extends through outlet plate 44 and is in fluid communication with fuel supply line 18. Fluid communication from outlet plate outlet passage 52 to fuel supply line 18 is accommodated through a fuel outlet fitting 54 which passes through an opening in housing 30 such that one end of fuel outlet fitting 54 is attached to outlet plate outlet passage 52 and the other end of fuel outlet fitting 54 is attached to fuel supply line 18. Outlet plate 44 also includes an outlet plate flow channel 56 formed in the face of outlet plate 44 that faces toward impeller 42 and is in fluid communication with outlet plate outlet passage 52. Outlet plate 44 also includes an outlet plate aperture, hereinafter referred to as lower bearing 58, extending through outlet plate 44. Shaft 36 extends through lower bearing 58 in a close fitting relationship such that shaft 36 is able to rotate freely within lower bearing 58 and such that radial movement of shaft 36 within lower bearing 58 is limited to the manufacturing tolerances of shaft 36 and lower bearing 58. In this way, lower bearing 58 radially supports a lower end of shaft 36 that is proximal to pump section 26.

Impeller 42 includes a plurality of blades 60 arranged in a polar array radially surrounding and centered about axis 38 such that blades 60 are aligned with inlet plate flow channel 50 and outlet plate flow channel 56. Blades 60 are each separated from each other by a blade chamber 62 that passes through impeller 42 in the general direction of axis 38. Impeller 42 may be made, for example only, by a plastic injection molding process in which the preceding features of impeller 42 are integrally molded as a single piece of plastic.

Electric motor 34 includes a rotor or armature 64 with a plurality of circumferentially spaced motor windings 66, a commutator portion 68, and shaft 36 such that armature 64 rotates about axis 38. Electric motor 34 also includes a stator 70 with a motor frame 72, a pair of permanent magnets 74, and a flux carrier 76. Each magnet 74 is in the shape of a segment of a hollow cylinder. Stator 70 circumferentially surrounds armature 64 such that a fuel passage 78 is defined radially between armature 64 and stator 70. Fuel passage 78 will be described in greater detail below. Motor frame 72 includes a top section 80 that is distal from pump section 26, a plurality of circumferentially spaced legs 82 extending axially from top section 80 toward pump section 26, and a base section 84 axially spaced apart from top section 80 by legs 82. Top section 80, legs 82, and base section 84 are preferably integrally formed from a single piece of plastic, for example only, by a plastic injection molding process.

Top section 80 of motor frame 72 includes a first electrical terminal 86 and a second electrical terminal 88 extending therefrom and protruding through an end cap 90 which terminates motor section 28 distal from pump section 26. First electrical terminal 86 and second electrical terminal 88 are arranged to be connected to electricity source 20 such that first electrical terminal 86 and second electrical terminal 88 are opposite in polarity. First electrical terminal 86 and second electrical terminal 88 may be disposed within preformed openings in top section 80 or first electrical terminal 86 and second electrical terminal 88 may be insert molded with top section 80 when motor frame 72 is formed by a plastic injection molding process. First electrical terminal 86 is in electrical communication with a first carbon brush 92 while second electrical terminal 88 is in electrical communication with a second carbon brush 94. First carbon brush 92 is disposed within a first brush holder 96 that is defined by top section 80 and is urged into contact with commutator portion 68 of armature 64 by a first brush spring 98 that is grounded to end cap 90. Second carbon brush 94 is disposed within a second brush holder 100 defined by top section 80 and is urged into contact with commutator portion 68 of armature 64 by a second brush spring 102 that is grounded to end cap 90. First carbon brush 92 and second carbon brush 94 deliver electrical power to motor windings 66 via commutator portion 68, thereby rotating armature 64 and shaft 36 about axis 38 in use.

Top section 80 of motor frame 72 defines an upper bearing 104 therein which radially supports an upper end of shaft 36 that is proximal to end cap 90. Shaft 36 is able to rotate freely within upper bearing 104 such that radial movement of shaft 36 within upper bearing 104 is limited to the manufacturing tolerances of shaft 36 and upper bearing 104.

Legs 82 are preferably equally circumferentially spaced around top section 80 and base section 84 and define motor frame openings 106 between legs 82. Motor frame openings 106 extend axially from top section 80 to base section 84. One magnet 74 is disposed within each motor frame opening 106 and magnets 74 may be inserted within respective motor frame openings 106 after motor frame 72 has been formed. Alternatively, magnets 74 may be insert molded with motor frame 72 when motor frame 72 is formed by a plastic injection molding process. In this way, magnets 74 and legs 82 radially surround armature 64. While two legs 82 and two magnets 74 have been illustrated, it should be understood that other quantities of legs 82 and magnets 74 may be used.

Base section 84 may be annular in shape and connects legs 82 to each other. Base section 84 includes a base section recess 108 extending axially thereinto from the end of base section 84 that faces away from top section 80. Base section recess 108 is coaxial with upper bearing 104 and receives outlet plate 44 closely therein such that radial movement of outlet plate 44 within base section recess 108 is substantially prevented. Since base section recess 108 is coaxial with upper bearing 104, a coaxial relationship is maintained between lower bearing 58 and upper bearing 104 by base section 84. Base section 84 also defines an annular shoulder 110 that faces toward top section 80. Annular shoulder 110 may be substantially perpendicular to axis 38.

Flux carrier 76 is made of a ferromagnetic material and may take the form of a cylindrical tube. Flux carrier 76 closely radially surrounds legs 82 of motor frame 72 and magnets 74. Flux carrier 76 may be made, for example only, from a sheet of ferromagnetic material formed to shape by a rolling process. The end of flux carrier 76 that is proximal to base section 84 of motor frame 72 axially abuts annular should 96 of base section 84 while the end of flux carrier 76 that is proximal to top section 80 of motor frame 72 axially abuts a portion of end cap 90 that radially surrounds top section 80 of motor frame 72. In this way, flux carrier 76 is captured axially between end cap 90 and annular shoulder 110 of base section 84.

Figure 3:
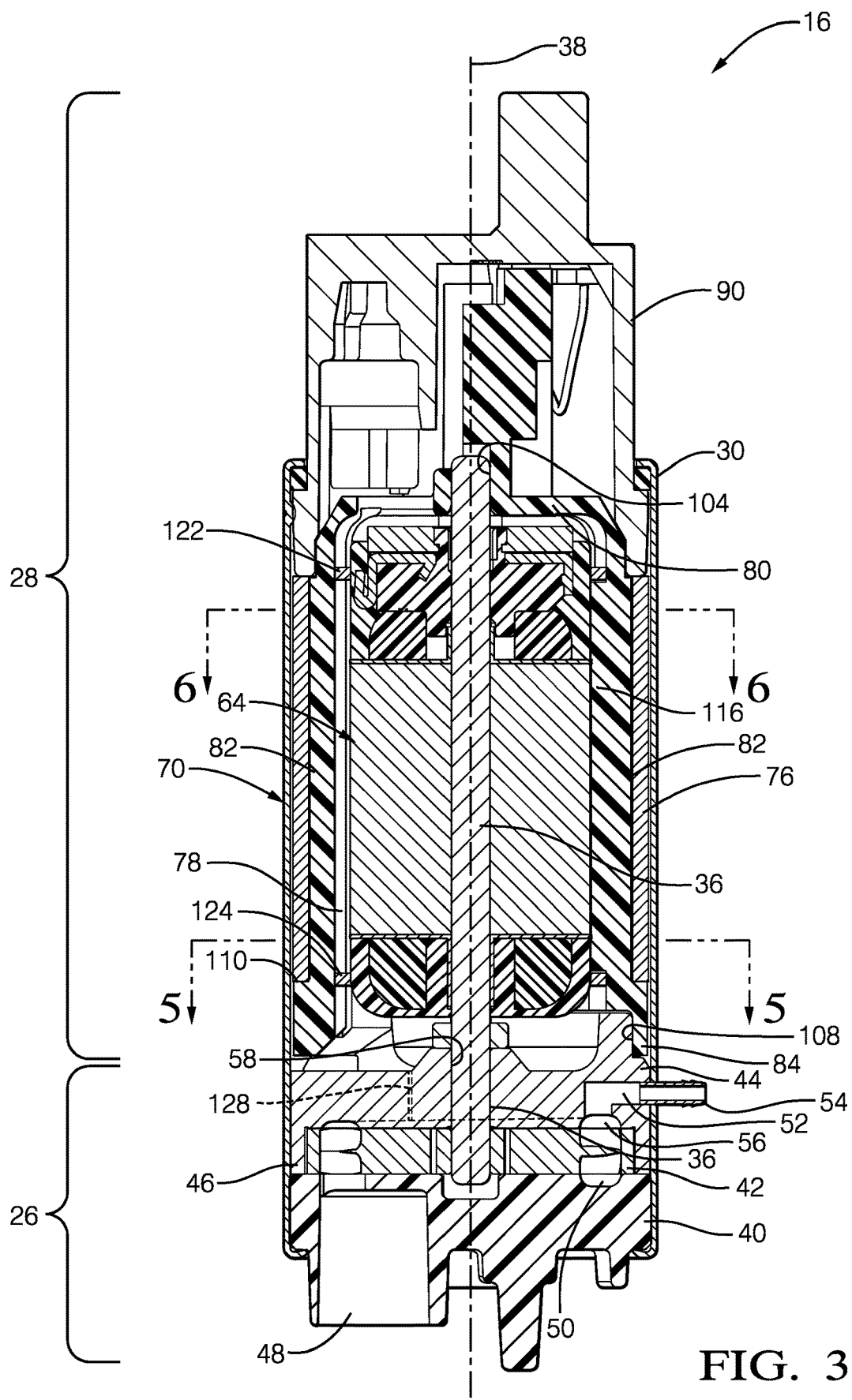
FIG. 3 is an axial cross-sectional view of the fuel pump of FIG. 2.
Figure 4:
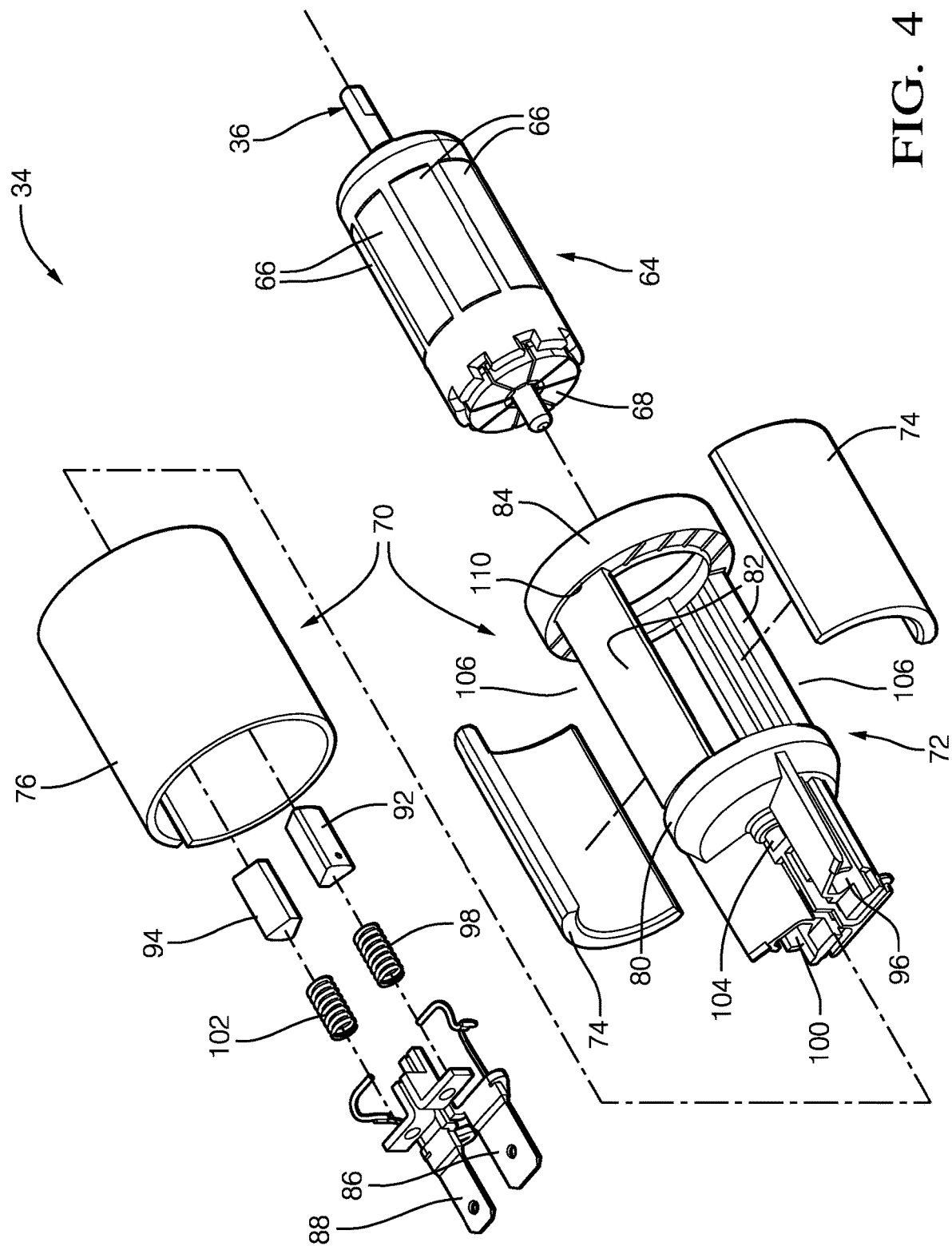
FIG. 4 is an exploded isometric view of an electric motor of the fuel pump of FIG. 2.
Figure 5:
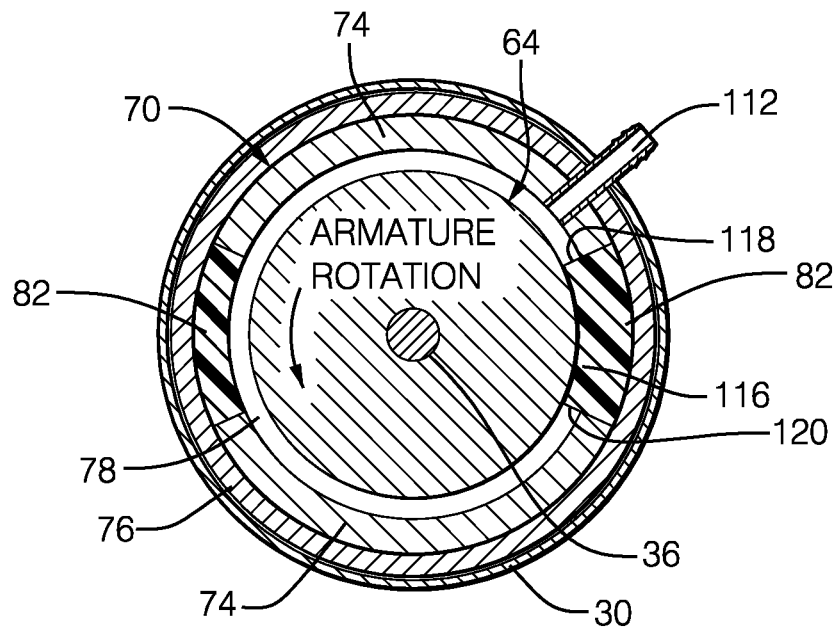
FIG. 5 is a radial cross-sectional view taken through section line 5-5 of FIG. 3.
Figure 6:
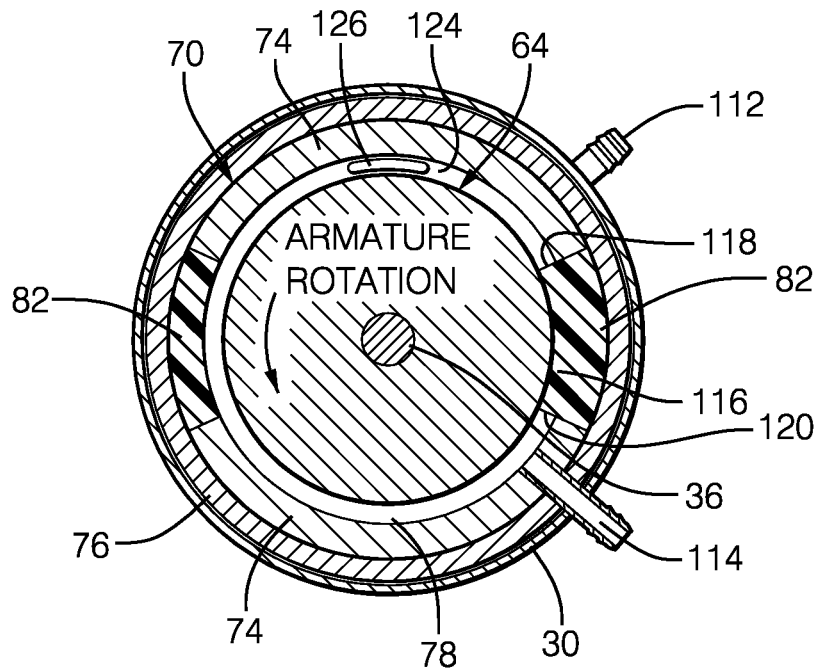
FIG. 6 is a radial cross-sectional view taken through section line 6-6 of FIG. 3.

In order to ensure that fuel reservoir 24 maintains an adequate amount of fuel therewithin to supply fuel to inlet plate inlet 48 when the fuel level within fuel tank 14 is below the top of fuel reservoir 24, motor section 28 includes a motor section fuel inlet 112 which is visible in FIGS. 1, 5, and 6, but which is not visible in FIG. 3 due to the plane through which fuel pump 16 is sectioned. Motor section fuel inlet 112 extends from fuel passage 78 through housing 30 to fluidly connect with fuel reservoir line 32, and in this way, fluid communication is provided from the portion of fuel tank 14 that is not within fuel reservoir 24 to fuel passage 78. Motor section 28 also includes a motor section fuel outlet 114 which extends from fuel passage 78 through housing 30 and opens into fuel reservoir 24. Motor section fuel outlet 114 is visible in FIGS. 1 and 6, but which is not visible in FIG. 3 due to the plane through which fuel pump 16 is sectioned. Rotation of armature 64 creates a viscous drag on the fuel within fuel passage 78 which creates a flow velocity at the surface of the armature 64, thereby causing the fuel to flow circumferentially in the direction of rotation of armature 64. As oriented in FIGS. 5 and 6, armature 64 rotates counterclockwise, thereby causing a circumferential flow component on the fuel in the counterclockwise direction within fuel passage 78. A flow impedance member 116 is provided within fuel passage 78 such that flow impedance member 116 extends from a location proximal to pump section 26 to a location proximal to end cap 90. Flow impedance member 116 may be fixed to stator 70, and may, by way of non-limiting example only, be integrally formed with one leg 82 of motor frame 72. Flow impedance member 116 extends radially into fuel passage 78 from stator 70 such that flow impedance member 116 is in close proximity to armature 64, thereby impeding the circumferential flow of fuel within fuel passage 78. Flow impedance member 116 defines an upstream face 118 from which the circumferential flow of fuel within fuel passage 78 flows away from and flow impedance member 116 also defines a downstream face 120 to which the circumferential flow of fuel within fuel passage 78 flows toward. By impeding the circumferential flow of fuel within fuel passage 78, a pressure gradient is generated within fuel passage 78 where the lowest pressure occurs at upstream face 118 and the highest pressure occurs at downstream face 120. In this way, upstream face 118 and downstream face 120 are opposing sides of flow impedance member 116 across which a pressure gradient is generated, where upstream face 118 is on a low pressure side of flow impedance member 116 and downstream face 120 is on a high pressure side of flow impedance member 116. Motor section fuel inlet 112 is located proximal to upstream face 118 while motor section fuel outlet 114 is located proximal to downstream face 120. Furthermore, motor section fuel inlet 112 is located proximal to pump section 26 while motor section fuel outlet 114 is located proximal to end cap 90, and in this way, fuel within fuel passage 78 travels in a direction that has a component in a direction parallel to axis 38. Consequently, rotation of armature 64 draws fuel into fuel passage 78 through fuel reservoir line 32/motor section fuel inlet 112 and discharges fuel into fuel reservoir 24 through motor section fuel outlet 114 in order to maintain an adequate level of fuel within fuel reservoir 24. As shown, flow impedance member 116 may extend in the direction of axis 38, or may alternatively extend in a helical arrangement such that the helix is pitched upward in the direction of flow from motor section fuel inlet 112 to motor section fuel outlet 114. While flow impedance member 116 has been illustrated as being integrally formed as a part of motor frame 72, it should now be understood that flow impedance member 116 may alternatively be formed as a separate piece and subsequently bonded to stator 70 or otherwise held stationary within fuel passage 78.

In order to minimize or prevent fuel from bypassing around the axial ends of flow impedance member 116, an upper flow barrier 122 and a lower flow barrier 124 may be provided at respective axial ends of flow impedance member 116. Upper flow barrier 122 and lower flow barrier 124 are each annular in shape and are located within fuel passage 78 such that respective outer peripheries thereof engage a complementary inner periphery of stator 70 and such that respective inner peripheries thereof closely surround armature 64 in order to minimize fuel leakage between upper flow barrier 122/lower flow barrier 124 and armature 64. In this way, pumping effectiveness from motor section fuel inlet 112 to motor section fuel outlet 114 is maximized. Lower flow barrier 124 may include a priming passage 126 extending axially therethrough in order to allow priming of fuel passage 78 from an outlet plate purge port 128 which extends axially through outlet plate 44 from outlet plate flow channel 56 to fuel passage 78. In this way, a small amount of fuel that is pumped by pump section 26 is diverted to fuel passage 78 to ensure that fuel passage 78 is always full of fuel for lubrication purposes and to ensure that fuel passage 78 is primed in order to allow pumping fuel from motor section fuel inlet 112 to motor section fuel outlet 114 due to the rotation of armature 64 imparting a circumferential flow component on the fuel within fuel passage 78.

It should be noted that motor section fuel outlet 114 can be located at a height within fuel reservoir 24 which creates a vacuum break when fuel pump 16 is not operating, thereby preventing fuel from draining out of fuel reservoir 24. However, if additional anti-siphon protection is needed, a small orifice can be added to the top of end cap 90 to function as a vacuum break to prevent fuel from draining out of fuel reservoir 24 when fuel pump 16 is not operating.

In order to enhance pumping from motor section fuel inlet 112 to motor section fuel outlet 114, the outer surface of armature 64 may be provided with features such as fins or ribs or with textures such as knurling. These features or textures may be provided in order to increase the viscous drag between armature 64 and the fuel within fuel passage 78. The increased viscous drag results in a higher flow velocity, thereby maximizing the pressure gradient within fuel passage 78.

Fuel pump 16 allows for filling of fuel reservoir 24 without parasitic loss of high pressure fuel flow produced by pump section 26. In this way, fuel pump 16 may improve the overall efficiency of fuel system 10 which can result in improved fuel economy and reduced harmful emissions of internal combustion engine 12. Furthermore, since fuel system 10 does not need a jet pump operated by high pressure fuel flow from pump section 26, the need for anti-siphon devises required to prevent drainage of fuel reservoir 24 can also be eliminated.

While this invention has been described in terms of preferred embodiments thereof, it is not intended to be so limited, but rather only to the extent set forth in the claims that follow.

I claim:

1. A fuel pump comprising:
    a motor having an armature which rotates about an axis, said motor also having a stator which circumferentially surrounds said armature such that a fuel passage is defined radially between said armature and said stator, whereby rotation of said armature induces a circumferential flow of fuel within said fuel passage;
    a pumping arrangement which is rotated by said armature and which pumps fuel from a first inlet of said fuel pump to a first outlet of said fuel pump;
    a second inlet which introduces fuel into said fuel passage, wherein fuel introduced into said fuel passage through said second inlet does not pass through said first inlet;
    a second outlet which discharges fuel from said fuel passage, wherein fuel discharged from said fuel passage through said second outlet does not pass through said first outlet; and
    a flow impedance member in said fuel passage which impedes said circumferential flow of fuel within said fuel passage, thereby generating a pressure gradient across opposing sides of said flow impedance member within said fuel passage such that fuel entering said fuel passage through said second inlet at a low pressure side of said flow impedance member is pumped through said fuel passage to said second outlet at a high pressure side of said flow impedance member.

2. A fuel pump as in claim 1, further comprising an upper flow barrier within said fuel passage at a first end of said flow impedance member that is proximal to said second outlet, said upper flow barrier minimizing fuel from bypassing around said first end of said flow impedance member.

3. A fuel pump as in claim 2, further comprising a lower flow barrier within said fuel passage at a second end of said flow impedance member that is proximal to said second inlet, said lower flow barrier minimizing fuel from bypassing around said second end of said flow impedance member.

4. A fuel pump as in claim 3, wherein said upper flow barrier and said lower flow barrier are annular in shape such that respective outer peripheries thereof engage said stator and such that respective inner peripheries thereof closely surround said armature.

5. A fuel pump as in claim 3, wherein said lower flow barrier includes a priming passage extending axially therethrough which primes said fuel passage with fuel pumped from said pumping arrangement.

6. A fuel pump as in claim 1, further comprising a lower flow barrier within said fuel passage at a first end of said flow impedance member that is proximal to said second inlet, said lower flow barrier minimizing fuel from bypassing around said first end of said flow impedance member.

7. A fuel pump as in claim 6, wherein said lower flow barrier includes a priming passage extending axially therethrough which primes said fuel passage with fuel pumped from said pumping arrangement.

8. A fuel pump as in claim 1, further comprising:
    a housing within which said pumping arrangement and said motor are each located;
    an inlet plate disposed within said housing, said inlet plate including said first inlet which introduces fuel to said housing; and
    an outlet plate disposed within said housing, said outlet plate having an outlet plate outlet passage;
    wherein said first outlet extends through said housing into said outlet plate outlet passage.

9. A fuel pump as in claim 8, wherein:
    said second inlet extends through said housing to said fuel passage; and
    said second outlet extends through said housing from said fuel passage.

10. A fuel supply system for supplying fuel to a fuel consuming device, said fuel supply system comprising:
    a fuel tank which holds a volume of fuel;
    a fuel reservoir disposed within said fuel tank; and a fuel pump comprising:

a motor having an armature which rotates about an axis, said motor also having a stator which circumferentially surrounds said armature such that a fuel passage is defined radially between said armature and said stator, whereby rotation of said armature induces a circumferential flow of fuel within said fuel passage;

a pumping arrangement which is rotated by said armature and which pumps fuel from within said fuel reservoir through a first inlet of said fuel pump to said fuel consuming device through a first outlet of said fuel pump;

a second inlet which introduces fuel into said fuel passage from within said fuel tank and outside of said fuel reservoir;

a second outlet which discharges fuel from said fuel passage to said fuel reservoir; and a flow impedance member in said fuel passage which impedes said circumferential flow of fuel within said fuel passage, thereby generating a pressure gradient across opposing sides of said flow impedance member within said fuel passage such that fuel entering said fuel passage through said second inlet at a low pressure side of said flow impedance member is pumped through said fuel passage to said second outlet at a high pressure side of said flow impedance member.

11. A fuel supply system as in claim 10, wherein said fuel pump further comprises an upper flow barrier within said fuel passage at a first end of said flow impedance member that is proximal to said second outlet, said upper flow barrier minimizing fuel from bypassing around said first end of said flow impedance member.

12. A fuel supply system as in claim 11, wherein said fuel pump further comprises a lower flow barrier within said fuel passage at a second end of said flow impedance member that is proximal to said second inlet, said lower flow barrier minimizing fuel from bypassing around said second end of said flow impedance member.

13. A fuel supply system as in claim 12, wherein said upper flow barrier and said lower flow barrier are annular in shape such that respective outer peripheries thereof engage said stator and such that respective inner peripheries thereof closely surround said armature.

14. A fuel pump as in claim 12, wherein said lower flow barrier includes a priming passage extending axially therethrough which primes said fuel passage with fuel pumped from said pumping arrangement.

15. A fuel pump as in claim 10, further comprising a lower flow barrier within said fuel passage at a first end of said flow impedance member that is proximal to said second inlet, said lower flow barrier minimizing fuel from bypassing around said first end of said flow impedance member.

16. A fuel pump as in claim 15, wherein said lower flow barrier includes a priming passage extending axially therethrough which primes said fuel passage with fuel pumped from said pumping arrangement.

17. A fuel pump as in claim 10, further comprising:

a housing within which said pumping arrangement and said motor are each located;

an inlet plate disposed within said housing, said inlet plate including said first inlet which introduces fuel to said housing; and an outlet plate disposed within said housing, said outlet plate having an outlet plate outlet passage;

wherein said first outlet extends through said housing into said outlet plate outlet passage.

18. A fuel pump as in claim 17, wherein:

said second inlet extends through said housing to said fuel passage; and said second outlet extends through said housing from said fuel passage.

* * * * *